(12) United States Patent
Tsukahara et al.

(10) Patent No.: US 12,129,801 B2
(45) Date of Patent: Oct. 29, 2024

(54) CONTROL DEVICE FOR GAS TURBINE, GAS TURBINE FACILITY, METHOD FOR CONTROLLING GAS TURBINE, AND CONTROL PROGRAM FOR GAS TURBINE

(71) Applicant: MITSUBISHI HEAVY INDUSTRIES, LTD, Tokyo (JP)

(72) Inventors: Akitomo Tsukahara, Kanagawa (JP); Hidetaka Okui, Kanagawa (JP); Kimiyasu Fujita, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/287,958

(22) PCT Filed: Jul. 20, 2022

(86) PCT No.: PCT/JP2022/028194
§ 371 (c)(1),
(2) Date: Oct. 23, 2023

(87) PCT Pub. No.: WO2023/032498
PCT Pub. Date: Mar. 9, 2023

(65) Prior Publication Data
US 2024/0191662 A1    Jun. 13, 2024

(30) Foreign Application Priority Data

Aug. 30, 2021 (JP) .................................. 2021-139624

(51) Int. Cl.
*F02C 7/32* (2006.01)
*F01D 15/10* (2006.01)
(Continued)

(52) U.S. Cl.
CPC ................ *F02C 7/32* (2013.01); *F01D 15/10* (2013.01); *F01D 17/08* (2013.01); *F01D 21/14* (2013.01);
(Continued)

(58) Field of Classification Search
CPC ...... F02C 7/32; F02C 7/36; F02C 9/28; F01D 15/10; F01D 17/08; F01D 21/14;
(Continued)

(56) References Cited

U.S. PATENT DOCUMENTS

2006/0101826 A1    5/2006  Martis et al.
2011/0257801 A1*  10/2011  Kumula .................... H02P 9/04
                                                              700/287
(Continued)

FOREIGN PATENT DOCUMENTS

JP    11-132057    5/1999
JP    2007-505261  3/2007
(Continued)

OTHER PUBLICATIONS

International Search Report issued Oct. 4, 2022 in corresponding International Application No. PCT/JP2022/028194, with English translation.
(Continued)

*Primary Examiner* — Andrew H Nguyen
(74) *Attorney, Agent, or Firm* — Wenderoth, Lind & Ponack, L.L.P.

(57) ABSTRACT

This control device for a gas turbine connected to a power generator capable of linking to a power system is configured to be able to switch operation modes of the gas turbine between a normal operation mode in which the gas turbine rotationally drives the power generator and a reverse power operation mode in which the gas turbine is rotationally driven by the power generator actuated as a motor by
(Continued)

receiving power from the power system, the control device comprising: an index acquisition unit configured to acquire an index indicating the pressure ratio of a compressor of the gas turbine; and a signal output unit configured to output a signal for protecting the compressor when the index becomes less than a threshold value while the gas turbine is operating in the reverse power operation.

6 Claims, 6 Drawing Sheets

(51) Int. Cl.
| | | |
|---|---|---|
| *F01D 17/08* | (2006.01) | |
| *F01D 21/14* | (2006.01) | |
| *F01D 25/04* | (2006.01) | |
| *F02C 7/36* | (2006.01) | |
| *F02C 9/28* | (2006.01) | |

(52) U.S. Cl.
CPC ............... *F01D 25/04* (2013.01); *F02C 7/36* (2013.01); *F02C 9/28* (2013.01); *F05D 2220/76* (2013.01); *F05D 2270/10* (2013.01); *F05D 2270/101* (2013.01); *F05D 2270/3015* (2013.01)

(58) Field of Classification Search
CPC .. F01D 25/04; F05D 2220/76; F05D 2270/10; F05D 2270/101; F05D 2270/3015
See application file for complete search history.

(56) References Cited

U.S. PATENT DOCUMENTS

| | | | |
|---|---|---|---|
| 2012/0017602 A1* | 1/2012 | Hansen | F01D 19/00 60/790 |
| 2012/0247115 A1 | 10/2012 | Sasahara et al. | |
| 2018/0328817 A1* | 11/2018 | Andrews | G01M 15/14 |
| 2019/0301300 A1* | 10/2019 | Chiasson | F02C 9/28 |
| 2021/0140372 A1* | 5/2021 | Collopy | F02C 6/14 |

FOREIGN PATENT DOCUMENTS

| | | |
|---|---|---|
| JP | 2012-26444 | 2/2012 |
| WO | 2005/028832 | 3/2005 |
| WO | 2012/132062 | 10/2012 |

OTHER PUBLICATIONS

International Preliminary Report on Patentability issued Mar. 14, 2024 in corresponding International Application No. PCT/JP2022/028194, with English translation.

* cited by examiner

CONTROL DEVICE FOR GAS TURBINE, GAS TURBINE FACILITY, METHOD FOR CONTROLLING GAS TURBINE, AND CONTROL PROGRAM FOR GAS TURBINE

TECHNICAL FIELD

The present disclosure relates to a control device for a gas turbine, a gas turbine facility, a method for controlling a gas turbine, and a control program for a gas turbine.

The present application claims priority based on Japanese Patent Application No. 2021-139624 filed in Japan on Aug. 30, 2021, the contents of which are incorporated herein by reference.

BACKGROUND ART

A gas turbine device that drives a turbine with a combustion gas generated by combustion of a fuel usually includes a compressor for compressing a fuel gas or an oxidant gas (air or the like).

PTL 1 discloses a gas turbine including a gas compressor for compressing a gas fuel to be supplied to a combustor. Further, in PTL 1, in order to prevent surging of the gas compressor, the gas turbine is operated such that a pressure ratio (compression ratio) of the gas compressor does not exceed a limit value, and in a case where the pressure ratio of the gas compressor exceeds a limit value, an operation of the gas turbine is urgently stopped to protect the device.

CITATION LIST

Patent Literature

[PTL 1] International Publication No. WO2012/132062

SUMMARY OF INVENTION

Technical Problem

Meanwhile, a gas turbine device to which a generator is connected normally operates in an operation mode (normal operation mode) in which the generator is rotationally driven by the gas turbine. However, in a case where there is no demand for power generation, the gas turbine device is sometimes operated in an operation mode (reverse power operation mode) in which the gas turbine is rotationally driven by a generator that receives power supply from the outside and functions as a motor.

In the reverse power operation of the gas turbine, the generator assists the driving of the turbine. Therefore, a fuel supply amount to the gas turbine can be decreased to such a level that the gas turbine does not misfire. On the other hand, in the reverse power operation of the gas turbine, the fuel supply amount is decreased in this way. Therefore, a pressure ratio (compression ratio) of the compressor is lowered compared to that in the normal operation. In a case where the pressure ratio of the compressor decreases in the reverse power operation, a flow velocity of a fluid increases in a subsequent stage of the compressor, and greatly deviates from a design flow velocity condition in the normal operation (rated operation or the like). As a result, forced vibration of a compressor vane becomes stronger, and a risk of damage to the compressor vane may increase.

In view of the above circumstances, an object of at least one embodiment of the present invention is to provide a control device for a gas turbine, a gas turbine facility, a method for controlling a gas turbine, and a control program for a gas turbine capable of preventing occurrence of damage to a compressor.

Solution to Problem

According to at least one embodiment of the present invention, there is provided a control device for a gas turbine that is connected to a generator interconnectable to a power system, the gas turbine being configured to switch an operation mode between a normal operation mode in which the gas turbine rotationally drives the generator and a reverse power operation mode in which the gas turbine is rotationally driven by the generator that receives power from the power system and operates as a motor, the control device including: an index acquisition unit that acquires an index indicating a pressure ratio of a compressor of the gas turbine; and a signal output unit that outputs a signal for protecting the compressor in a case where the index becomes lower than a threshold value during an operation of the gas turbine in the reverse power operation mode.

Further, according to at least one embodiment of the present invention, there is provided a gas turbine facility including: a gas turbine that is connected to a generator interconnectable to a power system; and the control device that controls the gas turbine.

Further, according to at least one embodiment of the present invention, there is provided a method for controlling a gas turbine that is connected to a generator interconnectable to a power system, the gas turbine being configured to switch an operation mode between a normal operation mode in which the gas turbine rotationally drives the generator and a reverse power operation mode in which the gas turbine is rotationally driven by the generator that receives power from the power system and operates as a motor, the method including: a step of acquiring an index indicating a pressure ratio of a compressor of the gas turbine; and a step of outputting a signal for protecting the compressor in a case where the index becomes lower than a threshold value during an operation of the gas turbine in the reverse power operation mode.

Further, according to at least one embodiment of the present invention, there is provided a control program for a gas turbine that is connected to a generator interconnectable to a power system, the gas turbine being configured to switch an operation mode between a normal operation mode in which the gas turbine rotationally drives the generator and a reverse power operation mode in which the gas turbine is rotationally driven by the generator that receives power from the power system and operates as a motor, the program causing a computer to execute: a procedure of acquiring an index indicating a pressure ratio of a compressor of the gas turbine; and a procedure of outputting a signal for protecting the compressor in a case where the index becomes lower than a threshold value during an operation of the gas turbine in the reverse power operation mode.

Advantageous Effects of Invention

According to at least one embodiment of the present invention, there are provided a control device for a gas turbine, a gas turbine facility, a method for controlling a gas turbine, and a control program for a gas turbine capable of preventing occurrence of damage to a compressor.

DESCRIPTION OF EMBODIMENTS

Figure 1:
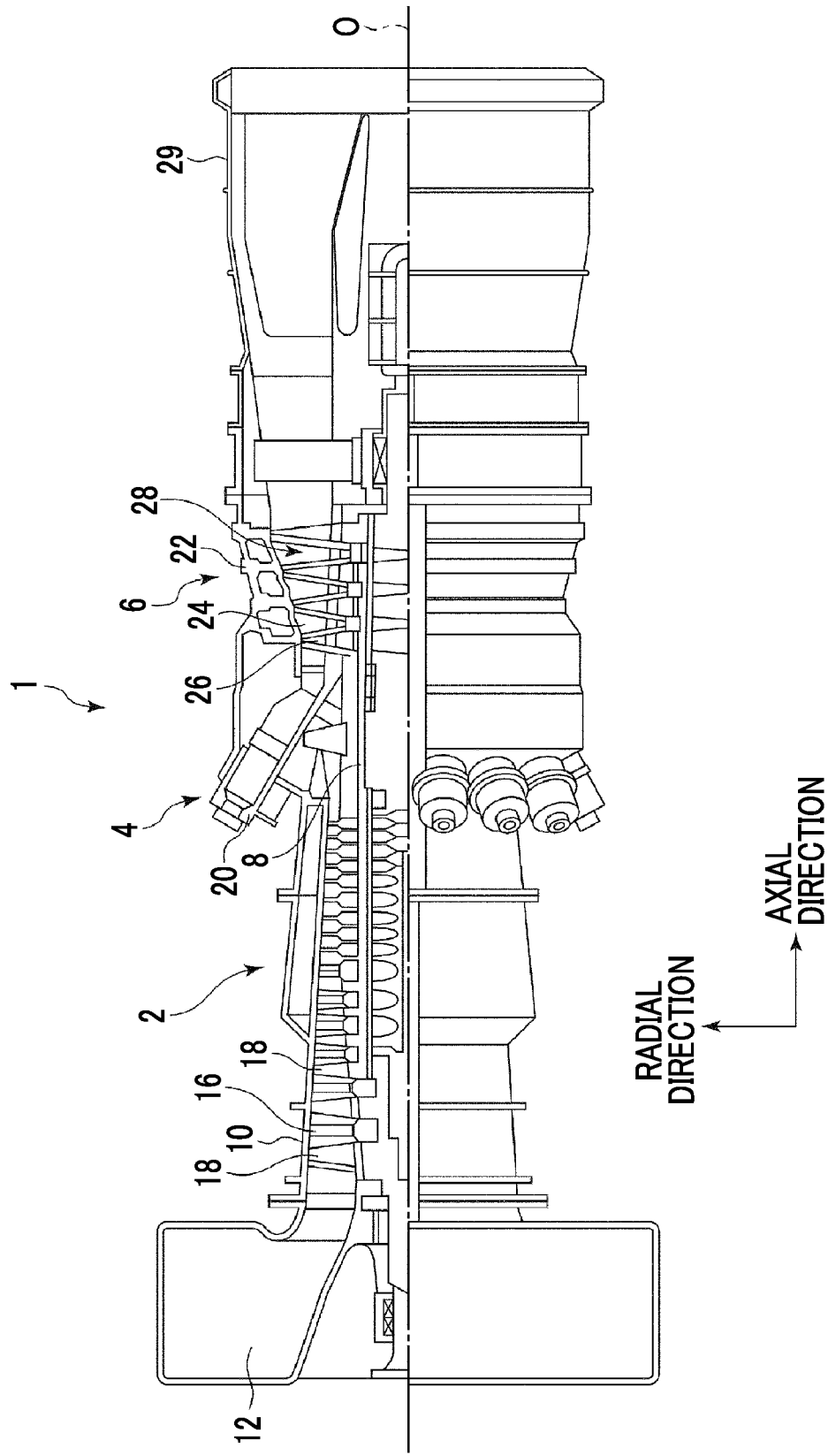
FIG. 1 is a schematic diagram of a gas turbine included in a gas turbine facility according to an embodiment.

Hereinafter, some embodiments of the present invention will be described with reference to the accompanying drawings. Dimensions, materials, shapes, relative arrangements, and the like of components described as embodiments or illustrated in the drawings are not intended to limit the scope of the present invention, but are merely explanatory examples.

(Configuration of Gas Turbine Facility)

Figure 2:
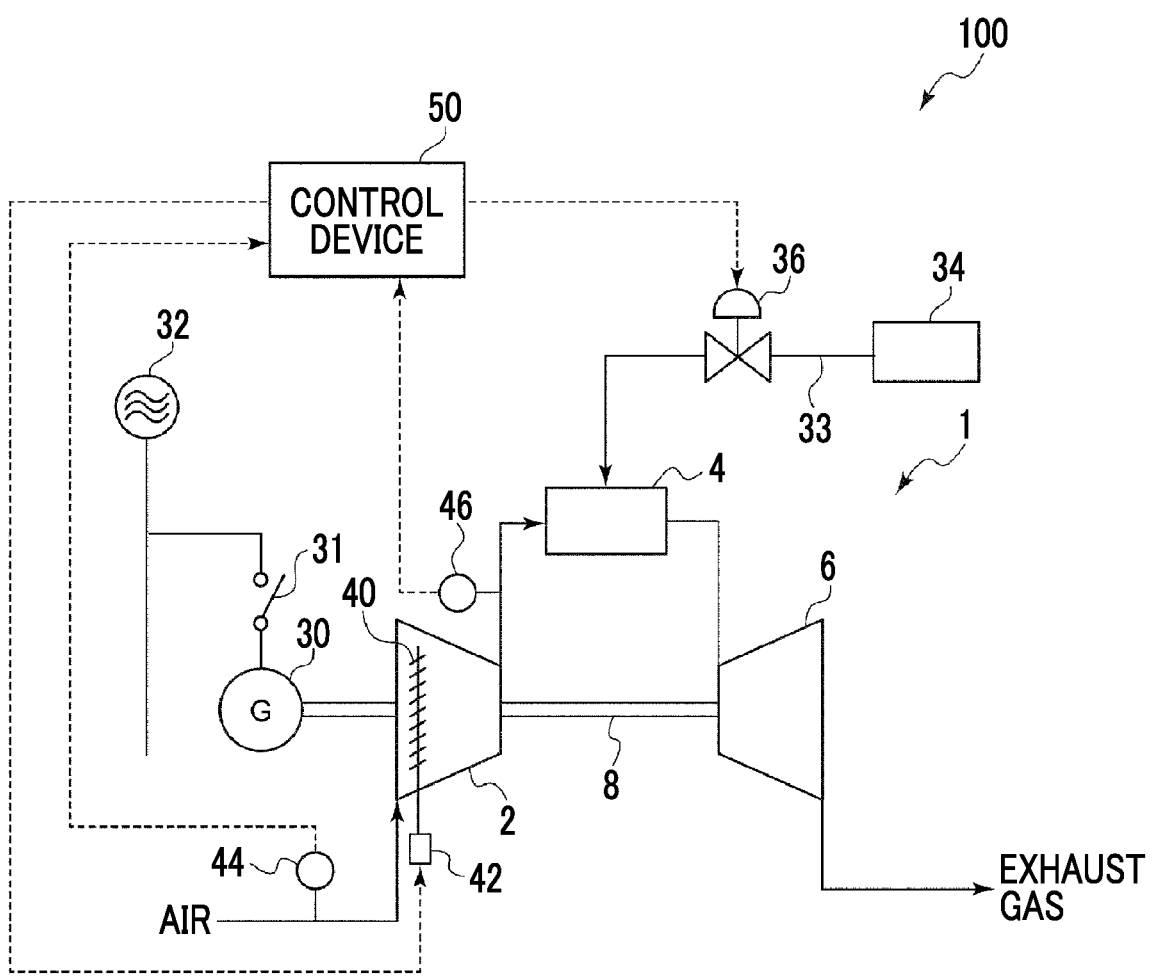
FIG. 2 is a schematic diagram of the gas turbine facility according to the embodiment.
Figure 3:
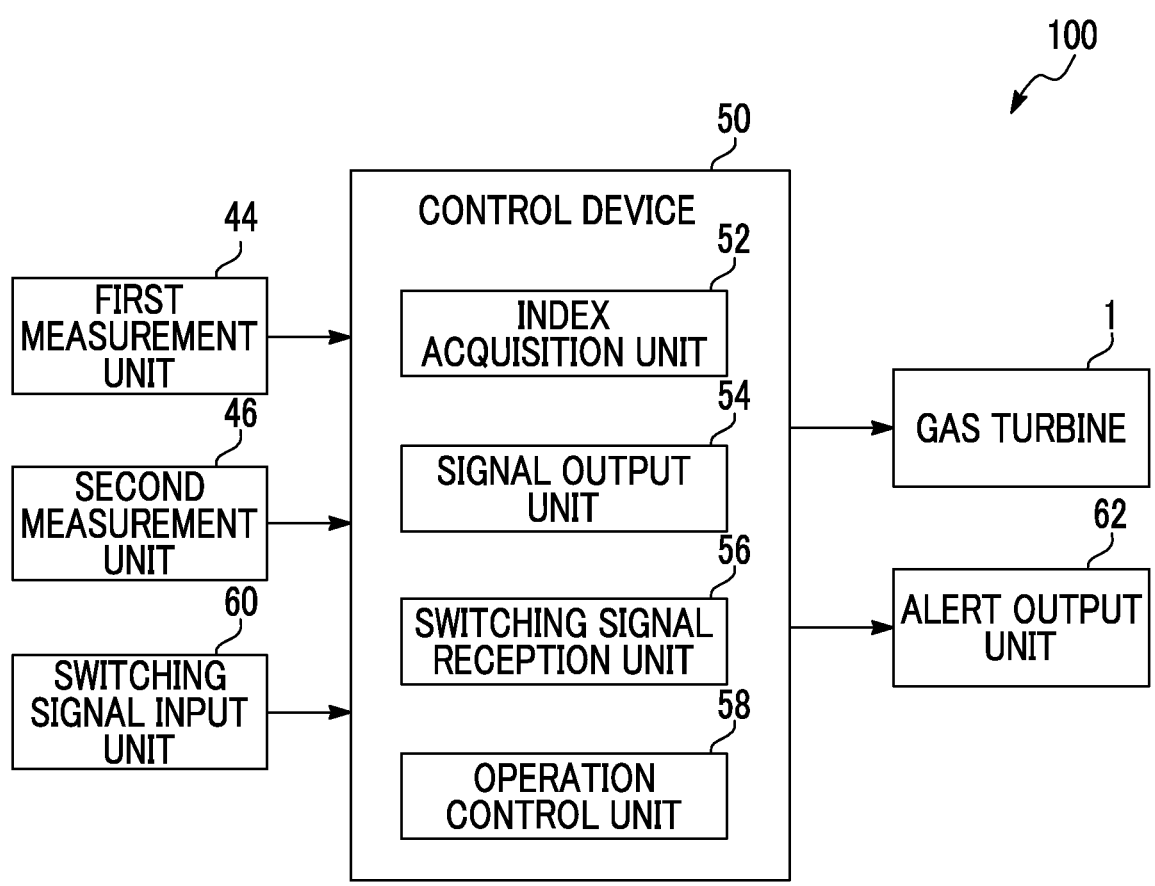
FIG. 3 is a schematic diagram of the gas turbine facility according to the embodiment.

FIG. 1 is a schematic diagram of a gas turbine included in a gas turbine facility according to an embodiment. FIG. 2 and FIG. 3 are schematic diagrams of the gas turbine facility according to the embodiment.

As illustrated in FIG. 2, a gas turbine facility 100 according to the embodiment includes a gas turbine 1 connected to a generator 30 and a control device 50 for controlling the gas turbine 1.

As illustrated in FIG. 1 and FIG. 2, the gas turbine 1 includes a compressor 2 for generating compressed air, a combustor 4 for generating a combustion gas using compressed air and fuel, and a turbine 6 configured to be rotationally driven by the combustion gas.

As illustrated in FIG. 1, the compressor 2 includes a plurality of stator vanes 16 fixed to a compressor casing 10 side and a plurality of rotor vanes 18 implanted on a rotor 8 so as to be alternately arranged with respect to the stator vanes 16. Air taken in from an air intake port 12 is sent to the compressor 2, and the air passes through the plurality of stator vanes 16 and the plurality of rotor vanes 18 and is compressed to be high-temperature and high-pressure compressed air.

The fuel and the compressed air generated by the compressor 2 are supplied to the combustor 4, and the fuel is combusted in the combustor 4. Thereby, a combustion gas serving as a working fluid of the turbine 6 is generated. As illustrated in FIG. 1, the gas turbine 1 includes a plurality of combustors 4 disposed in a casing 20 along a circumferential direction around the rotor 8 (a rotor shaft line O).

The turbine 6 includes a combustion gas pass 28 formed by a turbine casing 22, and includes a plurality of stator vanes 24 and a plurality of rotor vanes 26 provided in the combustion gas pass 28. The stator vane 24 is fixed to a turbine casing 22 side, and a stator vane row is configured with a plurality of stator vanes 24 arranged along the circumferential direction of the rotor 8. Further, the rotor vanes 26 are implanted on the rotor 8, and a rotor vane row is configured with a plurality of rotor vanes 26 arranged along the circumferential direction of the rotor 8. The stator vane row and the rotor vane row are alternately arranged in an axial direction of the rotor 8.

In the turbine 6, the combustion gas from the combustor 4 that is flowed into the combustion gas pass 28 passes through the plurality of stator vanes 24 and the plurality of rotor vanes 26. Thus, the rotor 8 is rotationally driven around the rotor shaft line O. Thereby, the generator connected to the rotor 8 is driven to generate power. After driving the turbine 6, the combustion gas is discharged to the outside via an exhaust chamber 29.

As illustrated in FIG. 2, the gas turbine 1 is connected to the generator 30 via the rotor 8 (rotary shaft). The generator 30 is interconnectable to a power system 32. A switch 31 is provided between the generator 30 and the power system 32 such that a connection state between the generator 30 and the power system 32 can be switched.

The generator 30 can be rotationally driven by the gas turbine 1 to generate power, and functions as a motor by receiving power supply from the power system 32. The generator 30 can rotationally drive the gas turbine 1.

As illustrated in FIG. 2, the fuel stored in a fuel storage portion 34 is supplied to the combustor 4 via a fuel supply line 33. It is not necessary to provide the fuel storage portion 34 in the gas turbine facility, and it is possible to receive fuel supply from a remote location via the fuel supply line 33. The fuel supply line 33 is provided with a fuel adjustment valve 36 for adjusting a flow rate (fuel supply amount) of the fuel supplied to the combustor 4. Although not illustrated, in order to adjust each fuel supply amount to a pilot nozzle and a main nozzle of the combustor 4 and a pilot ratio, control can be performed by using, for example, two or more fuel adjustment valves 36.

As illustrated in FIG. 2, an inlet guide vane (IGV) 40 for adjusting an intake amount of the compressor 2 is provided at an inlet of the compressor 2. An opening degree of the IGV 40 can be adjusted by an inlet guide vane control unit including an actuator 42.

The gas turbine 1 is provided with a first measurement unit 44 for measuring an inlet pressure of the compressor 2. In addition, the gas turbine 1 is provided with a second measurement unit 46 for measuring an outlet pressure of the compressor 2. The first measurement unit 44 and the second measurement unit 46 may be respectively pressure sensors. A signal indicating an inlet pressure detected by the first measurement unit 44 and a signal indicating an outlet pressure detected by the second measurement unit 46 are respectively sent to the control device 50.

The first measurement unit 44 is configured to measure a pressure at the inlet of the compressor 2 or at an upstream position of the inlet. The first measurement unit 44 may be configured to measure, for example, an atmospheric pressure. The second measurement unit 46 is configured to measure a pressure at a position between the outlet of the compressor 2 and the inlet of the combustor 4. For example, the second measurement unit 46 may be configured to measure a pressure of an air pass in the casing 20 in which the combustor 4 is accommodated.

The gas turbine 1 is configured to switch an operation mode between a normal operation mode and a reverse power operation mode.

The normal operation mode is an operation mode in which the gas turbine 1 rotationally drives the generator 30. In the normal operation mode, the power generated by the generator 30 is normally supplied to the power system 32.

On the other hand, the reverse power operation mode is an operation mode in which the generator 30 receives power supply from the power system 32 and operates as a motor to assist the rotational drive of the gas turbine 1. The gas turbine 1 may be operated in the reverse power operation mode for the purpose of supplying exhaust gas to a supply destination while reducing fuel consumption. During the operation in the reverse power operation mode, the generator 30 assists the driving of the turbine 6 of the gas turbine 1.

Thus, an amount of fuel supplied to the gas turbine 1 can be decreased compared to the operation in the normal operation mode.

The control device 50 is configured to control the gas turbine 1 based on the inlet pressure of the compressor 2 that is detected by the first measurement unit 44 and/or on the outlet pressure of the compressor 2 that is detected by the second measurement unit 46. As illustrated in FIG. 3, the control device 50 includes an index acquisition unit 52, a signal output unit 54, a switching signal reception unit 56, and an operation control unit 58.

The index acquisition unit 52 is configured to acquire an index indicating a pressure ratio of the compressor 2. Here, the pressure ratio of the compressor 2 is a ratio between the outlet pressure and the inlet pressure of the compressor 2. The index acquisition unit 52 may acquire, as the index indicating the pressure ratio, a ratio P2/P1 between a measured value P2 of the outlet pressure detected by the second measurement unit 46 and a measured value P1 of the inlet pressure detected by the first measurement unit 44. Alternatively, the index acquisition unit 52 may acquire, as the index indicating the pressure ratio, the measured value P2 of the outlet pressure detected by the second measurement unit 46. This is because the inlet pressure of the compressor 2 is substantially the same as the atmospheric pressure and can be regarded as being substantially constant.

The signal output unit 54 is configured to output a signal for protecting the compressor 2 in a case where the index indicating the pressure ratio is lower than (or equal to or lower than) a threshold value during the operation of the gas turbine 1 in the reverse power operation mode.

The signal output unit 54 may be configured to transmit, to the operation control unit 58 to be described later, as a signal for protecting the compressor 2, a signal for stopping the gas turbine 1 or a signal for switching the operation mode of the gas turbine 1 from the reverse power operation mode to the normal operation mode. Alternatively, the signal output unit 54 may be configured to transmit, as a signal for protecting the compressor 2, a signal for outputting an alert to an alert output unit 62. The alert output unit 62 may include a device (display, speaker, or the like) for outputting visual or auditory information indicating an alert.

The switching signal reception unit 56 is configured to receive a signal for switching the operation mode of the gas turbine 1 from the normal operation mode to the reverse power operation mode or from the reverse power operation mode to the normal operation mode. The switching signal reception unit 56 may be configured to receive a signal for switching the operation mode from a switching signal input unit 60. The switching signal input unit 60 may include a terminal device that can be operated by an operator, and may include, for example, an operation mode switching button, a keyboard, or a mouse.

The operation control unit 58 is configured to control the gas turbine 1 based on a signal that is from the signal output unit 54 and is for protecting the compressor 2 or a signal that is from the switching signal reception unit 56 and is for switching the operation mode. The operation control unit 58 may be configured to control, for example, an opening degree of the fuel adjustment valve 36 or a pilot ratio control unit 38 for adjusting the fuel supply to the combustor 4, or an operation amount of the actuator 42 for adjusting an opening degree of the inlet guide vane 40 based on the signal.

The control device 50 includes a computer including a processor (CPU or the like), a main storage device (memory device; RAM or the like), an auxiliary storage device, an interface, and the like. The control device 50 is configured to receive signals from the first measurement unit 44, the second measurement unit 46, or the switching signal input unit 60 via the interface. The processor is configured to process the signals received in this manner. In addition, the processor is configured to process a program loaded into the main storage device. Thereby, functions of the functional units (the index acquisition unit 52 and the like) are realized.

The processing content in the control device 50 is implemented as a program to be executed by the processor. The program may be stored in, for example, an auxiliary storage device. In a case where the program is executed, the program is loaded into the main storage device. The processor reads the program from the main storage device and executes a command included in the program.

(Control Flow of Gas Turbine)

Figure 4:
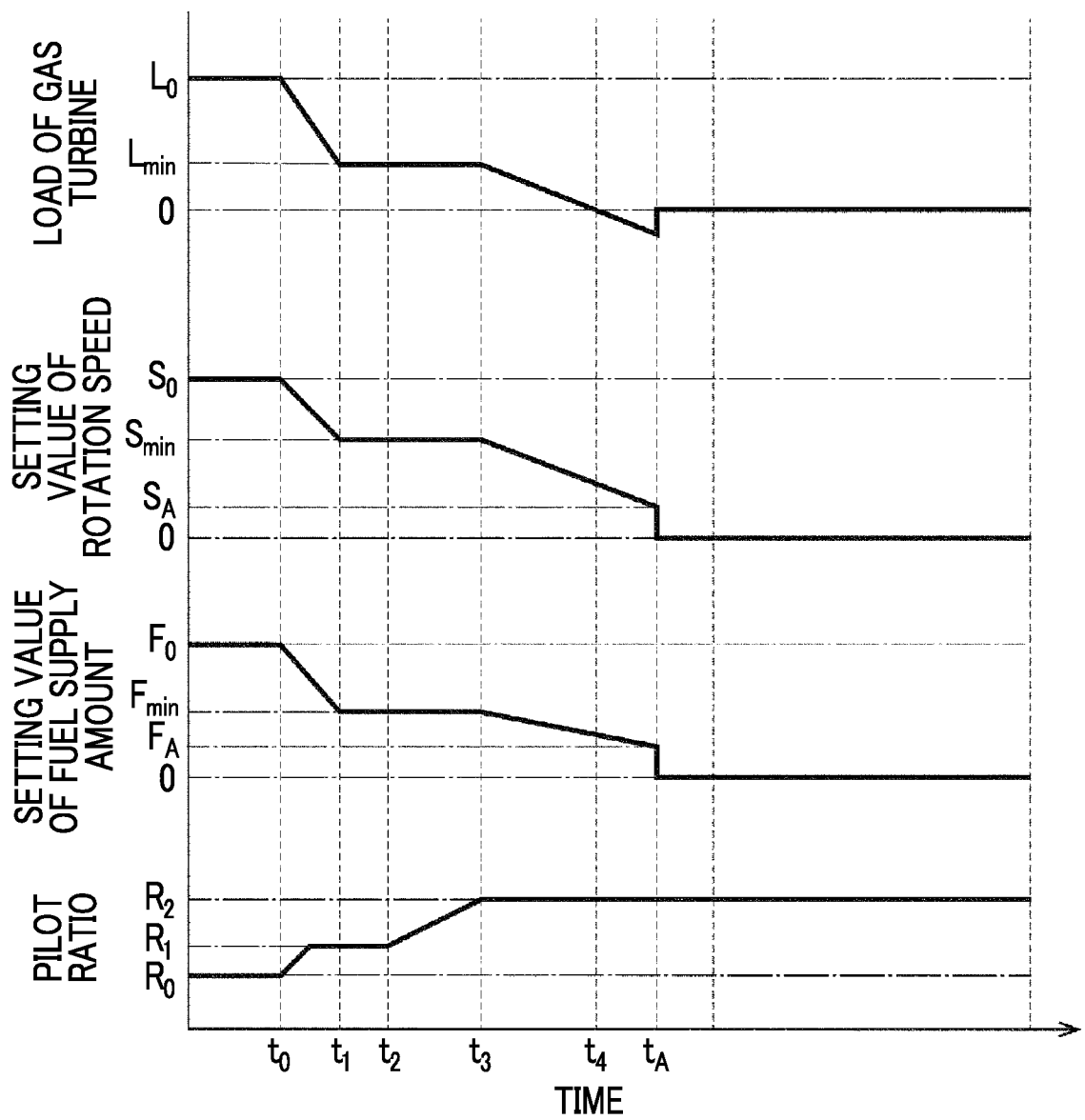
FIG. 4 is a diagram for describing a method for controlling the gas turbine according to the embodiment.
Figure 5:
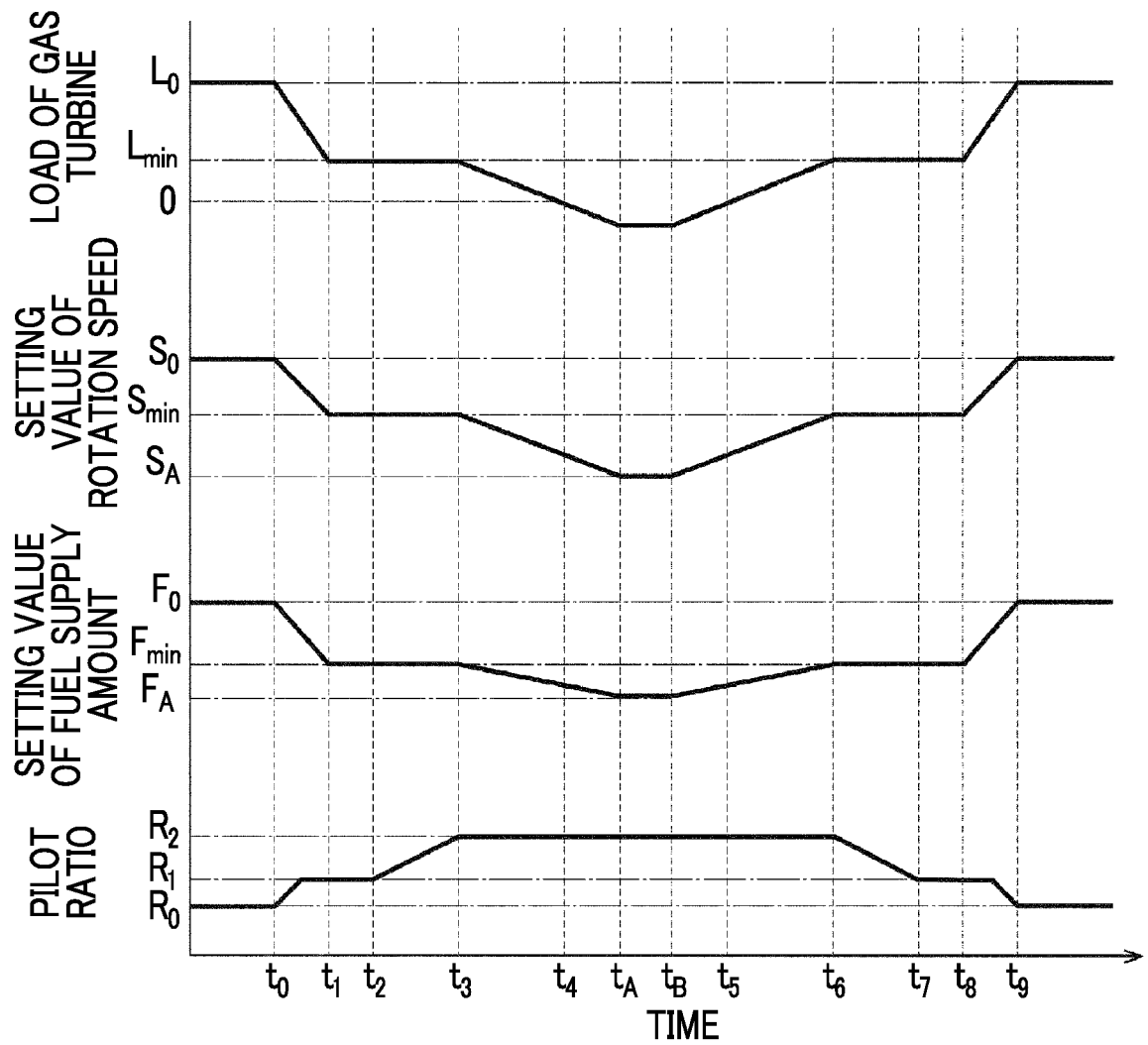
FIG. 5 is a diagram for describing the method for controlling the gas turbine according to the embodiment.
Figure 6:
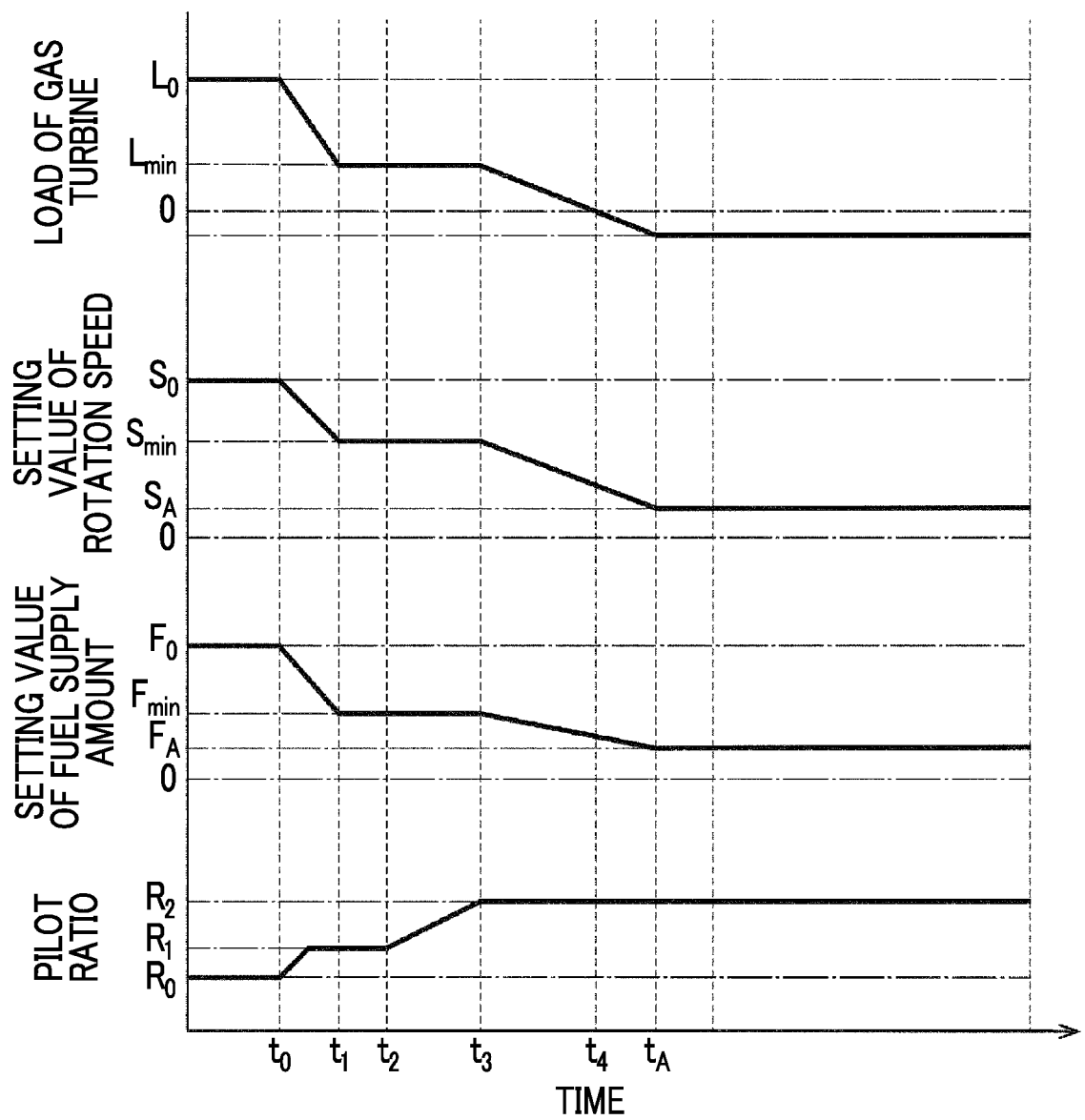
FIG. 6 is a diagram for describing the method for controlling the gas turbine according to the embodiment.

Hereinafter, a method for controlling the gas turbine 1 according to some embodiments will be described with reference to FIG. 4 to FIG. 6. In the following description, a case where the gas turbine 1 is controlled by using the control device 50 will be described. On the other hand, in some embodiments, the method for controlling the gas turbine may be executed by using another device. Alternatively, a part of a procedure to be described below may be manually performed. FIG. 4 to FIG. 6 are diagrams for explaining a method for controlling the gas turbine 1 according to the embodiment, and are graphs showing an example of temporal changes of a load during an operation of the gas turbine, a setting value of a rotation speed of the gas turbine (target rotation speed), a setting value of a fuel supply amount (fuel command value), and a pilot ratio of the fuel.

In FIG. 4 to FIG. 6, the gas turbine 1 is operated in the normal operation mode with a load L0 until a timing t0. The setting value of the rotation speed of the gas turbine 1 at the timing t0 is S0, the setting value of the fuel supply amount is F0, and the pilot ratio of the fuel is R0.

In the example illustrated in FIG. 4 to FIG. 6, at the timing t0, a preparation for switching the operation mode of the gas turbine 1 to the reverse power operation mode is started based on an instruction from an operator of the gas turbine facility 100. From the timing t0, the setting value of the fuel supply amount is decreased by decreasing the setting value of the rotation speed of the gas turbine 1. Thereby, the load of the gas turbine is also decreased from L0. The setting value of the fuel supply amount may be determined based on a deviation between the actual rotation speed of the gas turbine 1 and the setting value of the rotation speed. In a case where the generator 30 is interconnectable to the power system 32, the actual rotation speed of the gas turbine 1 is maintained within substantially the same range as the frequency of the power system 32. Therefore, the setting value of the fuel supply amount decreases based on the deviation.

From the timing t0, in order to prevent a misfire caused by a decrease in the fuel supply amount, the pilot ratio of the fuel or the opening degree of the IGV may be appropriately adjusted. For example, as illustrated in FIG. 4 to FIG. 6, the pilot ratio of the fuel may be increased from R0.

At a timing t1, the load of the gas turbine 1 becomes a minimum load Lmin in the normal operation mode (that is, the fuel supply amount to the combustor 4 becomes a minimum supply amount Fmin in the normal operation mode). At the timing t1, the pilot ratio is R1 (>R0). This operation condition is maintained from the timing t1 to a timing t2 after a specified period.

At the timing t2, for example, the operator operates the switching signal input unit 60, and thus, a signal for switching the operation mode of the gas turbine 1 from the normal operation mode to the reverse power operation mode is transmitted to the control device. Thereby, switching from the normal operation mode to the reverse power operation mode is started. In a case where the signal for switching the operation mode is received, the control device 50 increases the pilot ratio by controlling the pilot ratio control unit 38 via the operation control unit 58.

At a timing t3, the control device 50 controls the pilot ratio control unit 38 such that the increase in the pilot ratio is stopped. After the timing t3, the pilot ratio is maintained at R2 (>R1). The pilot ratio R2 is a pilot ratio at which transition to the reverse power operation mode can be performed.

Further, at the timing t3, the control device 50 may control the actuator 42 such that the opening degree of the IGV 40 becomes an opening degree suitable for the reverse power operation mode. In this way, at the timing t3, a condition for transition to the reverse power operation mode, such as the pilot ratio, is satisfied.

From the timing t3, the control device 50 further decreases the setting value of the rotation speed from Smin. As the setting value of the rotation speed decreases, a difference from the actual rotation speed (depending on the frequency of the power system 32) further increases. Thus, the setting value of the fuel supply amount further decreases. The control device 50 controls the fuel adjustment valve 36 based on the setting value of the fuel supply amount. As a result, the load of the gas turbine 1 is also further decreased from the minimum load Lmin in the normal operation mode.

At a timing t4, the load of the gas turbine 1 becomes zero. By continuing to decrease the setting value of the rotation speed at the timing t4, the setting value of the fuel supply amount to the combustor 4 continues to decrease. After the timing t4, the power from the power system 32 is supplied to the generator 30, and the generator 30 operates as a motor to assist the rotational drive of the gas turbine 1. That is, the reverse power operation of the gas turbine 1 is started.

After the timing t4, control for further decreasing the setting value of the fuel supply amount is performed. The setting value of the fuel supply amount after the timing t4 may be determined, for example, based on the deviation between the actual rotation speed of the gas turbine and the setting value of the rotation speed, or may be decreased to a minimum value determined by another method.

During the operation in the reverse power operation mode after the timing t4, the index acquisition unit 52 of the control device 50 acquires an index indicating the pressure ratio of the compressor 2 (for example, the ratio P2/P1 between the measured value P2 of the outlet pressure of the compressor 2 that is detected by the second measurement unit 46 and the measured value P1 of the inlet pressure detected by the first measurement unit 44, or the measured value P2 of the outlet pressure detected by the second measurement unit 46). In addition, the signal output unit 54 compares the index with the threshold value, and outputs a signal for protecting the compressor 2 in a case where the index is lower than the threshold value (or equal to or lower than the threshold value) (a timing $t_A$ in FIG. 4 to FIG. 6). In the example of FIG. 4 to FIG. 6, the setting value of the rotation speed at the timing $t_A$ is $S_A$, and the setting value of the fuel supply amount is $F_A$.

In the exemplary embodiment illustrated in FIG. 4, at the timing $t_A$, the signal output unit 54 transmits, to the operation control unit 58, as a signal for protecting the compressor 2, a signal for stopping the gas turbine 1. In this case, at the timing $t_A$, the setting value of the fuel supply amount and the setting value of the rotation speed are set to zero. Thereby, the gas turbine 1 is stopped. The load of the gas turbine becomes zero. In addition to the example illustrated in FIG. 4, starting from the timing $t_A$, the setting value of the fuel supply amount and the setting value of the rotation speed may be decreased at a constant ratio to be set to zero within a predetermined time.

In the exemplary embodiment illustrated in FIG. 5, at the timing $t_A$, the signal output unit 54 transmits, to the operation control unit 58, as a signal for protecting the compressor 2, a signal for switching the operation mode of the gas turbine 1 from the reverse power operation mode to the normal operation mode. The operation control unit 58 switches the operation mode of the gas turbine 1 from the reverse power operation mode to the normal operation mode.

In the example illustrated in FIG. 5, from the timing $t_A$ to a timing $t_B$ after a specified period, the setting value of the fuel supply amount and the setting value of the rotation speed may maintain the values at the timing $t_A$. After the timing $t_B$, a procedure opposite to the preparation for switching the operation mode from the normal operation mode to the reverse power operation mode as already described above may be performed.

That is, the setting value of the fuel supply amount is increased by increasing the setting value of the rotation speed from the timing $t_B$. Thereby, the load of the gas turbine 1 is increased. At a timing t5, the load of the gas turbine 1 becomes zero. After the timing t5, the generator 30 is rotationally driven by the gas turbine 1. That is, the operation of the gas turbine 1 in the normal operation mode is restarted. At a timing t6, in a case where the setting value of the rotation speed becomes Smin and the setting value of the fuel supply amount becomes Fmin, the pilot ratio is decreased from R2 while maintaining the setting value Smin of the rotation speed. At a timing t7, in a case where the pilot ratio R2 reaches a value suitable for increasing the fuel supply amount, at a timing t8, the setting value of the rotation speed is increased, and thus, the fuel supply amount is increased. Thereby, the load of the gas turbine is increased. At a timing t9, the setting value of the rotation speed is increased to S0, and the load of the gas turbine is increased to L0. Thereby, transition of the gas turbine 1 to the normal operation mode is completed.

In the exemplary embodiment illustrated in FIG. 6, at the timing $t_A$, the signal output unit 54 outputs, as a signal for protecting the compressor 2, a signal for outputting an alert. In the example illustrated in FIG. 6, after an alert is output at the timing $t_A$, the setting value $S_A$ of the fuel supply amount and the setting value $F_A$ of the rotation speed at the timing $t_A$ are maintained for a predetermined time. In some embodiments, after an alert is output, control to stop the gas turbine 1 or control to switch the operation mode to the normal operation mode may be performed.

In the reverse power operation of the gas turbine 1, the generator 30 assists the driving of the turbine 6. Therefore, the fuel supply amount to the gas turbine 1 can be decreased to such a level that the gas turbine 1 does not misfire. On the other hand, in the reverse power operation of the gas turbine 1, the fuel supply amount is decreased in this way. Therefore, the pressure ratio (compression ratio) of the compressor 2 is lowered compared to that in the normal operation. In a case where the pressure ratio of the compressor 2 decreases in the reverse power operation, a flow velocity of a fluid increases in a subsequent stage of the compressor 2, and greatly deviates from a design flow velocity condition in the normal operation (rated operation or the like). As a result, forced vibration of the compressor vane becomes stronger, and a risk of damage to the compressor vane may increase.

In this regard, according to the device or the method according to the above-described embodiment, in a case where the index indicating the pressure ratio of the compressor 2 of the gas turbine 1 becomes lower than the threshold value during the operation of the gas turbine 1 in the reverse power operation mode, a signal for protecting the compressor 2 is output. Here, the signal for protecting the compressor 2 is, for example, a signal for stopping the gas turbine 1, a signal for switching the operation mode of the gas turbine 1 from the reverse power operation mode to the normal operation mode, or a signal for outputting an alert. Therefore, by controlling the operation of the gas turbine 1 based on the signal, it is possible to prevent occurrence of damage to the compressor 2 (for example, damage to the compressor vane due to increased vibration of the compressor vane) caused by performing reverse power operation in a state where the pressure ratio of the compressor 2 is too small.

In addition, in some embodiments, the pressure ratio P2/P1 of the compressor that is calculated based on the measured value P2 of the outlet pressure of the compressor 2 and on the measured value P1 of the inlet pressure of the compressor 2 is acquired as an index. Alternatively, in some embodiments, the measured value P2 of the outlet pressure of the compressor 2 is acquired as an index. In this way, it is possible to acquire an appropriate index as an index indicating the pressure ratio of the compressor 2. In addition, the signal for protecting the compressor 2 is output based on the index, and thus, it is possible to effectively prevent occurrence of damage to the compressor 2.

For example, the content described in each embodiment is understood as follows.

(1) According to at least one embodiment of the present invention, there is provided a control device (50) for a gas turbine (1) that is connected to a generator (30) interconnectable to a power system (32), the gas turbine being configured to switch an operation mode between a normal operation mode in which the gas turbine rotationally drives the generator and a reverse power operation mode in which the gas turbine is rotationally driven by the generator that receives power from the power system and operates as a motor, the control device including: an index acquisition unit (52) that acquires an index indicating a pressure ratio of a compressor (2) of the gas turbine; and a signal output unit (54) that outputs a signal for protecting the compressor in a case where the index becomes lower than a threshold value during an operation of the gas turbine in the reverse power operation mode.

With the configuration according to (1), in a case where the index indicating the pressure ratio of the compressor of the gas turbine becomes lower than the threshold value during the operation of the gas turbine in the reverse power operation mode, a signal for protecting the compressor is output. Therefore, by controlling the operation of the gas turbine based on the signal, it is possible to prevent occurrence of damage to the compressor (for example, damage to the compressor vane due to increased vibration of the compressor vane) caused by performing reverse power operation in a state where the pressure ratio of the compressor is too small.

(2) In some embodiments, in the configuration according to (1), the index acquisition unit acquires a measured value P2 of an outlet pressure of the compressor and a measured value P1 of an inlet pressure of the compressor, and acquires, as the index, a ratio P2/P1 between the measured value P2 of the outlet pressure and the measured value P1 of the inlet pressure.

With the configuration according to (2), the pressure ratio P2/P1 of the compressor that is calculated based on the measured value P2 of the outlet pressure of the compressor and on the measured value P1 of the inlet pressure of the compressor is acquired as an index. Therefore, it is possible to acquire an appropriate index as an index indicating the pressure ratio of the compressor. In addition, the signal for protecting the compressor is output based on the index, and thus, it is possible to effectively prevent occurrence of damage to the compressor.

(3) In some embodiments, in the configuration according to (1), the index acquisition unit acquires a measured value P2 of an outlet pressure of the compressor, and acquires, as the index, the measured value P2 of the outlet pressure.

In a typical gas turbine, the inlet pressure of the compressor is substantially equal to the atmospheric pressure and is substantially constant. Therefore, the outlet pressure of the compressor can be used as an index of the pressure ratio (a ratio between the outlet pressure and the inlet pressure) of the compressor. In this regard, with the configuration according to (3), the measured value P2 of the outlet pressure of the compressor is acquired as an index, and thus, it is possible to acquire an appropriate index as an index indicating the pressure ratio of the compressor. In addition, the signal for protecting the compressor is output based on the index, and thus, it is possible to effectively prevent occurrence of damage to the compressor.

(4) In some embodiments, in the configuration according to any one of (1) to (3), the signal output unit outputs, as the signal, a signal for stopping the gas turbine.

With the configuration according to (4), a signal for stopping the gas turbine is output in a case where the index indicating the pressure ratio of the compressor becomes lower than the threshold value. Therefore, by stopping the gas turbine based on the signal, it is possible to prevent occurrence of damage to the compressor caused by performing the reverse power operation in a state where the pressure ratio of the compressor is too small.

(5) In some embodiments, in the configuration according to any one of (1) to (3), the signal output unit outputs, as the signal, a signal for switching the operation mode of the gas turbine from the reverse power operation mode to the normal operation mode.

With the configuration according to (5), a signal for switching the operation mode of the gas turbine to the normal operation mode is output in a case where the index indicating the pressure ratio of the compressor becomes lower than the threshold value. Therefore, by switching the operation mode of the gas turbine based on the signal, it is possible to prevent occurrence of damage to the compressor caused by performing the reverse power operation in a state where the pressure ratio of the compressor is too small.

(6) In some embodiments, in the configuration according to any one of (1) to (3), the signal output unit outputs, as the signal, a signal for outputting an alert.

With the configuration according to (6), a signal for outputting an alert is output in a case where the index indicating the pressure ratio of the compressor becomes lower than the threshold value. Therefore, by outputting an alert based on the signal, for example, an operator can stop the gas turbine or switch the operation mode of the gas turbine to the normal operation mode. Thereby, it is possible to prevent occurrence of damage to the compressor caused by performing the reverse power operation in a state where the pressure ratio of the compressor is too small.

(7) According to at least one embodiment of the present invention, there is provided a gas turbine facility (100) including: a gas turbine (1) that is connected to a generator (30) interconnectable to a power system (32) and includes a compressor (2) for compressing air, a combustor (4) for generating a combustion gas by a combustion reaction between the compressed air from the compressor and a fuel, and a turbine (6) to be driven by the combustion gas from the combustor; and the control device (50) according to any one of (1) to (6) that controls the gas turbine.

With the configuration according to (7), in a case where the index indicating the pressure ratio of the compressor of the gas turbine becomes lower than the threshold value during the operation of the gas turbine in the reverse power operation mode, a signal for protecting the compressor is output. Therefore, by controlling the operation of the gas turbine based on the signal, it is possible to prevent occurrence of damage to the compressor (for example, damage to the compressor vane due to increased vibration of the compressor vane) caused by performing reverse power operation in a state where the pressure ratio of the compressor is too small.

(8) According to at least one embodiment of the present invention, there is provided a method for controlling a gas turbine (1) that is connected to a generator (30) interconnectable to a power system (32), the gas turbine being configured to switch an operation mode between a normal operation mode in which the gas turbine rotationally drives the generator and a reverse power operation mode in which the gas turbine is rotationally driven by the generator that receives power from the power system and operates as a motor, the method including: a step of acquiring an index indicating a pressure ratio of a compressor (2) of the gas turbine; and a step of outputting a signal for protecting the compressor in a case where the index becomes lower than a threshold value during an operation of the gas turbine in the reverse power operation mode.

With the method according to (8), in a case where the index indicating the pressure ratio of the compressor of the gas turbine becomes lower than the threshold value during the operation of the gas turbine in the reverse power operation mode, a signal for protecting the compressor is output. Therefore, by controlling the operation of the gas turbine based on the signal, it is possible to prevent occurrence of damage to the compressor (for example, damage to the compressor vane due to increased vibration of the compressor vane) caused by performing reverse power operation in a state where the pressure ratio of the compressor is too small.

(9) According to at least one embodiment of the present invention, there is provided a control program for a gas turbine (1) that is connected to a generator (30) interconnectable to a power system (32), the gas turbine being configured to switch an operation mode between a normal operation mode in which the gas turbine rotationally drives the generator and a reverse power operation mode in which the gas turbine is rotationally driven by the generator that receives power from the power system and operates as a motor, the program causing a computer to execute: a procedure of acquiring an index indicating a pressure ratio of a compressor (2) of the gas turbine; and a procedure of outputting a signal for protecting the compressor in a case where the index becomes lower than a threshold value during an operation of the gas turbine in the reverse power operation mode.

With the program according to (9), in a case where the index indicating the pressure ratio of the compressor of the gas turbine becomes lower than the threshold value during the operation of the gas turbine in the reverse power operation mode, a signal for protecting the compressor is output. Therefore, by controlling the operation of the gas turbine based on the signal, it is possible to prevent occurrence of damage to the compressor (for example, damage to the compressor vane due to increased vibration of the compressor vane) caused by performing reverse power operation in a state where the pressure ratio of the compressor is too small.

Although the embodiments of the present invention have been described, the present invention is not limited to the above-described embodiments, and includes modifications of the above-described embodiments and a combination of these embodiments as appropriate.

In the present specification, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state does not strictly represent only the equal state, but also a tolerance or a state where there is a difference to the extent that the same function can be obtained.

In addition, in the present specification, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

In addition, in the present specification, expressions such as "comprising", "including", or "having" one component are not exclusive expressions excluding the presence of other components.

REFERENCE SIGNS LIST

1: gas turbine
2: compressor
4: combustor
6: turbine
8: rotor
10: compressor casing
12: air intake port
16: stator vane
18: rotor vane
20: casing
22: turbine casing
24: stator vane
26: rotor vane
28: combustion gas pass
29: exhaust chamber
30: generator
31: switch
32: power system
33: fuel supply line
34: fuel storage portion
36: fuel adjustment valve
38: pilot ratio control unit
40: inlet guide vane
42: actuator 44: first measurement unit
46: second measurement unit
50: control device
52: index acquisition unit
54: signal output unit
56: switching signal reception unit
58: operation control unit
60: switching signal input unit
62: alert output unit
100: gas turbine facility
O: rotor shaft line

The invention claimed is:

1. A control device for a gas turbine that is connected to a generator interconnectable to a power system, the gas turbine being configured to switch an operation mode between a normal operation mode in which the gas turbine rotationally drives the generator and a reverse power operation mode in which the gas turbine is rotationally driven by the generator that receives power from the power system and operates as a motor, the control device comprising:
   an index acquisition unit that acquires an index indicating a pressure ratio of a compressor of the gas turbine;
   a signal output unit that outputs a signal for protecting the compressor in response to the index becoming lower than a threshold value during an operation of the gas turbine in the reverse power operation mode; and
   an operation control unit configured to control the gas turbine based on the signal,
   wherein the signal output unit outputs, as the signal, a signal for switching the operation mode of the gas turbine from the reverse power operation mode to the normal operation mode.

2. The control device for a gas turbine according to claim 1,
   wherein the index acquisition unit acquires a measured value P2 of an outlet pressure of the compressor and a measured value P1 of an inlet pressure of the compressor, and acquires, as the index, a ratio P2/P1 between the measured value P2 of the outlet pressure and the measured value P1 of the inlet pressure.

3. The control device for a gas turbine according to claim 1,
   wherein the index acquisition unit acquires a measured value P2 of an outlet pressure of the compressor, and acquires, as the index, the measured value P2 of the outlet pressure.

4. A gas turbine facility comprising:
   a gas turbine that is connected to a generator interconnectable to a power system and includes a compressor for compressing air, a combustor for generating a combustion gas by a combustion reaction between the compressed air from the compressor and a fuel, and a turbine to be driven by the combustion gas from the combustor; and
   the control device according to claim 1 that controls the gas turbine.

5. A method for controlling a gas turbine that is connected to a generator interconnectable to a power system, the gas turbine being configured to switch an operation mode between a normal operation mode in which the gas turbine rotationally drives the generator and a reverse power operation mode in which the gas turbine is rotationally driven by the generator that receives power from the power system and operates as a motor, the method comprising:
   acquiring an index indicating a pressure ratio of a compressor of the gas turbine; and
   switching the operation mode of the gas turbine from the reverse power operation mode to the normal operation mode in response to the index becoming lower than a threshold value during an operation of the gas turbine in the reverse power operation mode.

6. A non-transitory computer-readable storage medium for controlling a gas turbine that is connected to a generator interconnectable to a power system, the gas turbine being configured to switch an operation mode between a normal operation mode in which the gas turbine rotationally drives the generator and a reverse power operation mode in which the gas turbine is rotationally driven by the generator that receives power from the power system and operates as a motor, the storage medium having stored thereon instructions which, when executed by a processor, cause the processor to perform operations comprising:
   acquiring an index indicating a pressure ratio of a compressor of the gas turbine; and
   outputting a signal for switching the operation mode of the gas turbine from the reverse power operation mode to the normal operation mode in response to the index becoming lower than a threshold value during an operation of the gas turbine in the reverse power operation mode.

* * * * *